United States Patent

[11] 3,554,338

| [72] | Inventor | Hugh W. Kennedy, Jr.<br>Waynesboro, Va. |
|---|---|---|
| [21] | Appl. No. | 835,708 |
| [22] | Filed | June 23, 1969 |
| [45] | Patented | Jan. 12, 1971 |
| [73] | Assignee | General Electric Company<br>a corporation of New York |

[54] TWO-DIRECTIONAL ROTATION CLUTCH ASSEMBLY
11 Claims, 4 Drawing Figs.

[52] U.S. Cl. .................................................. 192/48.92,
74/10.8, 74/625, 192/45, 192/95
[51] Int. Cl. ........................................................ F16d 15/00
[50] Field of Search............................................. 192/44, 45,
48.1, 48.8, 48.9, 48.91, 48.92, 95; 74/10.8, 625

[56] References Cited
UNITED STATES PATENTS
1,950,694  3/1934  Parkinson..................... 192/48.92
2,561,745  7/1951  Lerch............................ 192/45(X)
3,194,368  7/1965  Benson et al. ................ 192/45

*Primary Examiner*—Allan D. Herrmann
*Attorneys*—Michael Masnik, Frank L. Neuhauser, Oscar B. Waddell and Joseph B. Forman ABSTRACT: A clutch assembly is shown which provides two-directional rotation to a shaft coupled therewith while permitting axial movement of the shaft with respect to the clutch assembly. The above is accomplished without the necessity for keyways, splines, flats, etc., on the shaft by providing a pair of clutches. One clutch is positioned for communicating rotational power to provide rotational power to provide rotation of the shaft in a clockwise direction and is free running in the counterclockwise direction. The other clutch is positioned to provide rotation of the shaft in the counterclockwise direction and is free running in the clockwise direction. The clutches are sized to permit relative axial movement of the shaft to the clutches.

PATENTED JAN 12 1971
3,554,338
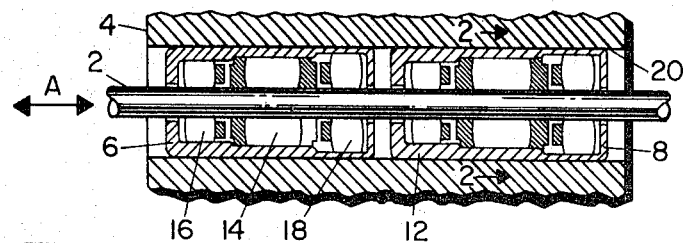
FIG. 1
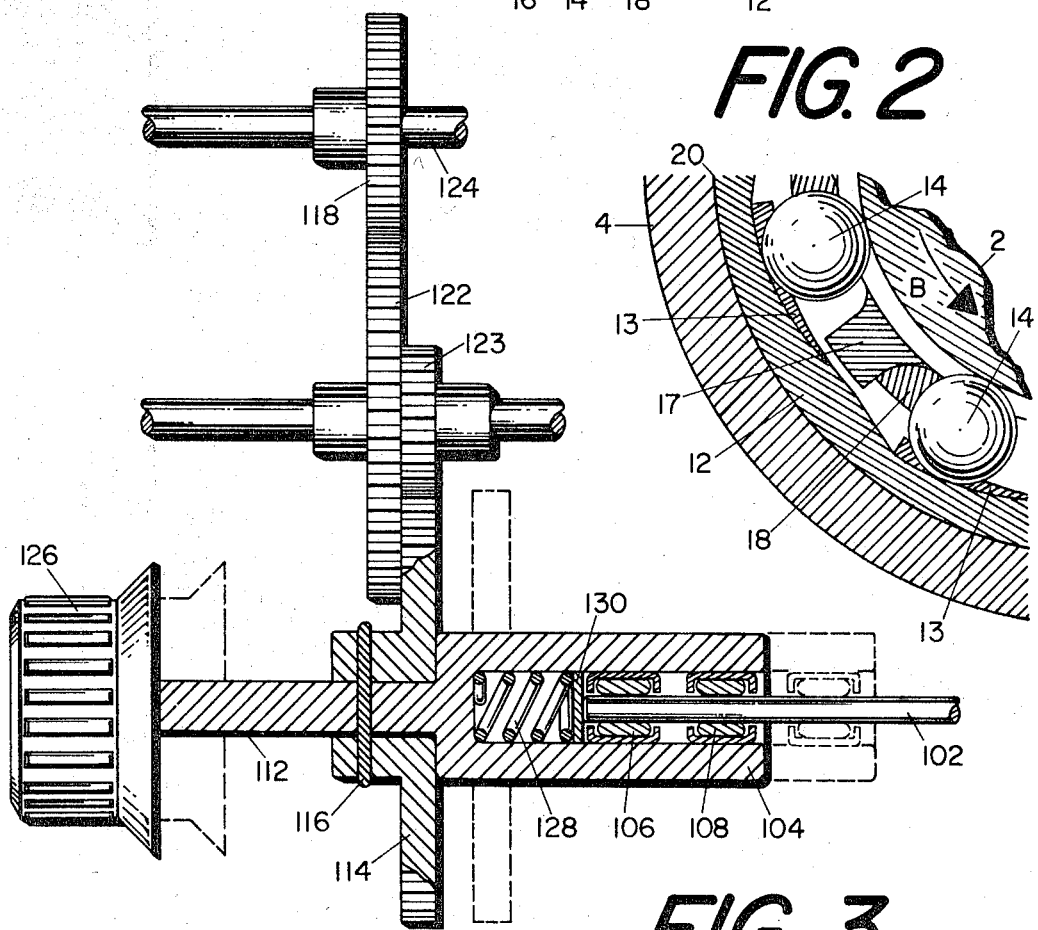
FIG. 2
FIG. 3
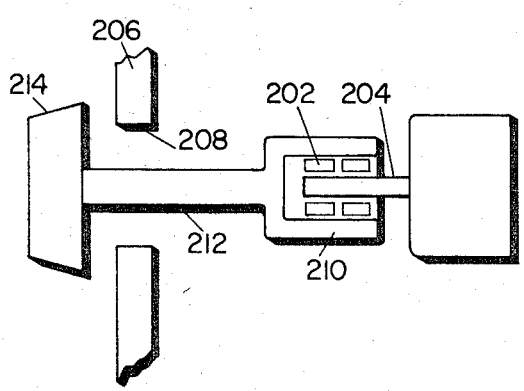
FIG. 4
INVENTOR.
HUGH W. KENNEDY JR.
BY Michael Masnik
HIS ATTORNEY the shaft.

3,554,338

TWO-DIRECTIONAL ROTATION CLUTCH ASSEMBLY

BACKGROUND OF THE INVENTION

This invention relates generally to clutch assemblies and, more particularly, to assemblies which provide two-directional rotation to a shaft coupled therewith while permitting relative axial movement of the clutch assembly with respect to the shaft.

In the design of any apparatus which utilizes a drive or driven shaft, many circumstances arise wherein it is desirable to regulate or adjust the rotational position of the shaft by means of some external member. Circumstances also arise wherein it is desirable to position around the shaft a housing which will rotate in either direction with the shaft, but which is capable of axial movement with respect to the shaft. Past solutions to this problem have employed keyways, splined shafts, flats or shoulders cut into the shafts, etc. The above devices, however, are subject to wear and could eventually result in a system wherein accurate rotational positioning of the shaft would be impossible. An additional problem with the use of the above items is the resulting backlash in the rotating system. This backlash would, of course, increase as the wear of the splines or flats increases.

It is an object of this invention, therefore, to provide an improved clutch assembly which permits relative axial movement between a shaft and a housing and clutch assembly surrounding the shaft while providing rotation to the shaft in either clockwise or counterclockwise direction upon rotation of the housing in a like direction.

It is a further object of this invention to provide two-directional rotation and relative axial movement without the necessity of keyways, splines, flats, or shoulders associated with the shaft.

Briefly stated, in accordance with one form of this invention, these objects are accomplished by providing a clutch assembly which includes a housing surrounding a portion of a drive or driven shaft and a pair of clutches installed between the housing and the shaft. One clutch is installed for communicating rotational power to provide rotation of the shaft in a clockwise direction and to be free running in the counterclockwise direction; the second is installed for communicating rotational power to provide rotation of the shaft in a counterclockwise direction and to be free running in the clockwise direction. The clutches are dimensioned so as to permit substantially frictionless relative axial movement between the shaft and the clutch assembly.

BRIEF DESCRIPTION OF THE DRAWINGS

While the specification concludes with claims particularly pointing out and distinctly claiming the subject matter of the invention which is sought to be protected, an understanding of the invention may be gained from the following detailed description of a preferred embodiment in connection with the accompanying drawings, in which:

FIG. 1 is a sectional view of one form of clutch assembly formed in accordance with this invention;

FIG. 2 is an enlarged partial sectional view, with portions broken away, taken along line 2-2 of FIG. 1;

FIG. 3 is a partial sectional view showing one use of a clutch assembly formed in accordance with this invention; and FIG. 4 is a partial sectional view showing another use of a clutch assembly formed in accordance with this invention.

Referring to the drawings, wherein like numerals refer to like elements throughout, a drive or driven shaft 2 is shown in FIG. 1. Surrounding the shaft 2 is a housing 4 which may form part of a manual control element or a drive element, depending upon the use of the shaft 2. Installed between the shaft 2 and the housing 4 are a pair of clutches 6 and 8. Clutch 6 is installed for communicating rotational power between the shaft 2 and the housing 4 in a counterclockwise direction, while clutch 8 is installed for communicating rotational power between the shaft 2 and the housing 4 in a clockwise direction.

In accordance with one embodiment of the invention, as shown in FIGS. 1 and 2, the clutches 6 and 8 comprise overrunning, drawn cup, roller clutches such as are described in detail in U.S. Pats. Nos. 3,184,020 and 3,194,368, each of which is assigned to the Torrington Company. Each of the clutches comprises basically a drawn cup 12, overrunning clutch elements 14, and a plurality of roller bearings 16 which lie on either side of the clutch elements 14. As shown in FIG. 2, the drawn cup 12 includes interior cam surfaces 13 which control the lockup and free running of the clutch elements 14. The clutch elements 14 are held in place by means of a generally cylindrical cage 17 which fits within the cup 12. The cage 17 includes a plurality of resilient fingers 18, which run axially along the length of the cage and are spaced between each of the clutch elements 14. The clutch elements 14 can easily be positioned by being forced radially into their desired position. When in their desired position, the clutch elements 14 are held against the cam surface 13 by means of the resilient, springlike fingers 18. The spring action lightly presses the clutch members 14 against the cam surface 13 which in turn directs the clutch members radially inward to a position, with the shaft 2 removed, wherein the clutch members 14 lie within the area normally occupied by the shaft 2. The clutch elements are dimensioned to permit substantially frictionless relative axial movement between the clutch members 14 and the shaft 2 when the clutch is positioned around the shaft. Due to the spring action described above, though, the clutch members 14 are in some frictional contact with the shaft 2 and the cam surfaces 13 when the clutch is placed around the shaft.

The clutch, as described above, is now ready to be used as an assembly component on any mechanism requiring the clutch assembly of the present invention. The cup 12 is pressed into a bore 20 in the housing 4, as shown in FIG. 1. The shaft 2 is then slid into the opening causing a slight outward movement of the clutch members 14. The outer diameter of the cup 12 is sized such that frictional engagement is obtained between the cup 12 and the housing 4. Rotation of the shaft 2 in a counterclockwise direction, as shown by arrow B of FIG. 2, or rotation of the housing 4 in a clockwise direction, causes wedging of the clutch member 14 of the clutch 6 between the shaft 2 and the cam surfaces 13, thereby forcing the outer member to rotate in the same direction as the shaft, or the shaft to rotate with the outer member. As previously mentioned, the clutch 8 is installed in precisely the opposite manner of the clutch 6 such that rotation of the shaft 2 in a clockwise direction or rotation of the housing 4 in a counterclockwise direction causes wedging of the clutch members between the shaft 2 and the cam surfaces 13, thereby forcing the housing 4 to rotate in the same direction as the shaft 2, or the shaft 2 to rotate with the housing 4. It should be apparent that while the shaft 2 is rotating in a counterclockwise direction, the clutch 8 is free running, i.e., the clutch members 14 of clutch 8 are not wedged against the cam surfaces 13. The same is true for the clutch 6 when the shaft 2 is rotating in the clockwise direction.

While the clutches 6 and 8 have been described in some detail, it should be obvious that this description is merely illustrative of the type of clutch which may be utilized in carrying out the broader aspects of this invention. That is, any clutch which would provide rotational power in one direction of rotation and be free running in the opposite direction of rotation while permitting relative axial movement between it and a shaft which it surrounds would be capable of being incorporated into this invention.

One use of the improved clutch assembly of this invention is shown in FIG. 3. The improved clutch assembly is there used to provide manual operation to a normally, motor-driven element or instrument. As shown therein, a shaft 102 forms part of a driven element or instrument (not shown), the rotational position of which needs to be controlled. The free end of the shaft 102 is positioned within a housing 104. Located between the shaft 102 and the housing 104 are a pair of clutches 106 and 108, corresponding to clutches 6 and 8 in FIG. 1. Clutch 106 is installed for communicating rotational power between the housing 104 and the shaft 102 in a clockwise direction, while clutch 108 is installed for communicating rotational power between the elements in a counterclockwise direction. Rotation of the housing 104 in either direction would thus result in rotation of the shaft 102 in the same direction.

As further shown in FIG. 3 drive means are provided for causing rotation of the housing 104 and suitable control means are envisioned for providing relative axial movement between the housing 104 and the shaft 102. Thus, one end of the housing 104 includes a shaft 112 which is preferably aligned with the center line of the drive shaft 102. A gear 114 surrounds a portion of the shaft 112 and is held in place by means of a pin 116. Suitable reduction gearing 118, 120 and 122 is provided to couple the shaft 102 to a drive shaft 124 which forms part of a motor (not shown) which normally powers the shaft 102. A coil spring 128 and a disc 130 are located within the housing 104 and serve to normally maintain the gears 114 and 120 in engagement.

The present invention is utilized to enable an operator to disengage the shaft 102 from the drive shaft 124 and to thereafter manually control the rotational position of the shaft 102. For this purpose, the shaft 102 is provided with a knob 126 (as shown in FIG. 3). When the operator desires to manually control the rotational position of the shaft 102, he pushes the knob 126 to its dotted line position of FIG. 3, thus disengaging the gear 114 from the gear 120. This permits rotation of the control knob 126 in either direction which results in rotation of the shaft 102 in a like direction.

When the control knob 126 is released, the spring 128 acts to force the housing 104 and its associated knob 126 back to its solid line position of FIG. 2. Use of the novel clutch assembly of this invention thus permits axial movement of the housing 104 with respect to the shaft 102 while yielding rotational connection between the shaft 102 and the housing 104 without the necessity for splines, keyways, shoulders, etc., on the shaft 102.

As shown in FIG. 4, a clutch assembly 202, corresponding to clutches 6 and 8 of FIG. 1, may be utilized to accurately control a drive shaft 204 located within an enclosure 206. The drive shaft 204 could, for example, form part of a potentiometer located within the body of a television set. All that is necessary to provide accurate indexing of the drive shaft 204 and thus the potentiometer, is to provide a suitable opening 208 in the enclosure 206. The opening 208 would permit access to the shaft 204 by means of the clutch assembly 202. As shown, the clutch assembly 202 includes a housing 210 which ends in a shaft 212 provided with a control knob 214. The clutch assembly 202 would be sized such that it could slide over the drive shaft 204 but would communicate rotational power to the shaft 204 upon rotation, in either direction, of the knob 214. The use of this type of clutch assembly permits continuous, i.e., essentially infinite, indexing of the shaft 204 through 360° without the necessity of removing the enclosure 206, and without the necessity of trying to line up hidden splines or shoulders on the shaft 204 with mating splines or shoulders on an indexing member. These features, of course, also permit more accurate indexing than is possible with the more conventional arrangements.

I claim:

1. A clutch assembly for providing two-directional rotation to a shaft which comprises:
   a. a housing for a desired portion of the shaft;
   b. a first clutch installed between said housing and the shaft for communicating rotational power to provide rotation of the shaft in a clockwise direction;
   c. a second clutch installed between said housing and the shaft for communicating rotational power to provide rotation of the shaft in a counterclockwise direction; and
   d. said clutches being dimensioned so as to permit substantially frictionless relative axial movement between said clutches and the shaft.

2. A clutch assembly as recited in claim 1 and further comprising control means for providing relative axial movement between said housing and the shaft whereby the communication of rotational power between said housing and the shaft is modified.

3. A clutch assembly as recited in claim 2 which further includes driving means connected to said housing for causing rotation thereof.

4. A clutch assembly as recited in claim 3 wherein axial movement of said housing by said control means causes disengagement of said housing from said driving means.

5. A clutch assembly as recited in claim 3 which further includes resilient means engaging said housing for normally maintaining said housing in connection with said driving means.

6. A clutch assembly as recited in claim 1 wherein said first and second clutches comprise overrunning clutches.

7. A clutch assembly as recited in claim 6 wherein said overrunning clutches further comprise drawn cups having interior cam surfaces and a plurality of clutch elements located within said cups in engagement with said cam surfaces, such that rotation of the housing in one direction causes wedging of the clutch members of said first clutch between the shaft and the cam surfaces thereby imparting rotation to the shaft in that direction, while at the same time, the clutch members of said second clutch are free running.

8. A clutch assembly as recited in claim 7 wherein said housing includes a bore and said drawn cup is frictionally engaged by said housing within said bore.

9. A clutch assembly for providing two-directional rotation to a shaft which comprises:
   a. a housing surrounding a portion of the shaft;
   b. a first overrunning clutch installed between said housing and the shaft for communicating rotational power to provide rotation of the shaft only in a clockwise direction;
   c. a second overrunning clutch installed between said housing and the shaft for communicating rotational power to provide rotation of the shaft in a counterclockwise direction;
   d. driving means connected to said housing for causing rotation thereof;
   e. manual control means connected to said housing for causing relative axial movement between said housing and the shaft, thereby causing disengagement of said driving means and said housing to permit manual rotation of said housing; and
   f. resilient means engaging said housing for normally maintaining said housing connected to said driving means.

10. A clutch assembly for providing two-directional rotation to a shaft which comprises:
    a. a first overrunning clutch axially mounted around a portion of said shaft for communicating rotational power to provide rotation of the shaft only in a clockwise direction while allowing relative axial movement of the clutch with respect to the shaft;
    b. a second overrunning clutch for communicating rotational power to provide rotation of the shaft only in a counterclockwise direction while allowing relative axial movement of the clutch with respect to the shaft;
    c. a common manual control means for causing relative axial movement between said housing and the shaft to remove rotational power from being applied to said shaft, for aligning said clutches circumferentially at any desired angle around said shaft and for causing relative axial movement between said clutches and said shaft to restore the communication of rotational power to said shaft.

11. An arrangement according to claim 10 wherein said clutches each comprises a tubular housing, cammed surfaces provided on the interior of said housing, and spring biased rollers providing rotational power between the circumferential surface of said shaft and said cammed surfaces.